United States Patent
Zia et al.

(10) Patent No.: US 12,157,084 B2
(45) Date of Patent: Dec. 3, 2024

(54) PLEATED MEDIA FOR A CONICAL SHAPED FILTER ELEMENT

(71) Applicants: Majid Zia, White Bear Lake, MN (US); Michael Spearman, The Woodlands, TX (US); Allan Alden, Stacy, MN (US); Martin Gene Miller, The Woodlands, TX (US)

(72) Inventors: Majid Zia, White Bear Lake, MN (US); Michael Spearman, The Woodlands, TX (US); Allan Alden, Stacy, MN (US); Martin Gene Miller, The Woodlands, TX (US)

(73) Assignee: XFINIO, LLC, St. Paul, MN (US)

( * ) Notice: Subject to any disclaimer, the term of this patent is extended or adjusted under 35 U.S.C. 154(b) by 673 days.

(21) Appl. No.: 17/295,575

(22) PCT Filed: Dec. 2, 2019

(86) PCT No.: PCT/US2019/063988
§ 371 (c)(1),
(2) Date: May 20, 2021

(87) PCT Pub. No.: WO2020/113215
PCT Pub. Date: Jun. 4, 2020

(65) Prior Publication Data
US 2022/0016562 A1 Jan. 20, 2022

Related U.S. Application Data

(60) Provisional application No. 62/774,116, filed on Nov. 30, 2018.

(51) Int. Cl.
*B01D 53/22* (2006.01)
*B01D 46/00* (2022.01)
(Continued)

(52) U.S. Cl.
CPC ....... *B01D 46/522* (2013.01); *B01D 46/0001* (2013.01); *B01D 46/2403* (2013.01);
(Continued)

(58) Field of Classification Search
CPC ............ B01D 2275/201; B01D 46/528; B01D 46/2403; B01D 46/522; B01D 46/0001; B01D 2275/10
See application file for complete search history.

(56) References Cited

U.S. PATENT DOCUMENTS 3,273,321 A * 9/1966 Bauder .................. B01D 46/02
55/504
3,550,423 A 12/1970 Gewiss
(Continued)

FOREIGN PATENT DOCUMENTS

| CN | 108671633 A | 10/2018 |
|---|---|---|
| JP | 2008/188499 A | 8/1989 |

OTHER PUBLICATIONS

European Patent Office, International Search Report with Written Opinion issued in PCT/US2019/063988, dated Feb. 21, 2020, 11 pages, European Patent Office, Rijswijk, Netherlands.

*Primary Examiner* — Anthony R Shumate
(74) *Attorney, Agent, or Firm* — Nancy Wilker

(57) ABSTRACT

A frusto-conical filter includes at least one layer of a filtering material, wherein one or more layers of the at least one layer of a filtering material comprises a plurality of pleats. Each of the pleats has a center axis which essentially maintains a constant distance from the center axis of its adjoining pleats. The media filter has a first end and a second end, the second end being spaced apart from the first end, and one of the first and second ends is larger than the other of the first and second ends. A method of making this media involves cutting out a frusto-conical section from a generically
(Continued)

shaped media and aligning it in such a way as to maintain the constant distance of the pleats from the adjacent pleats.

4 Claims, 6 Drawing Sheets

(51) Int. Cl.
*B01D 46/24* (2006.01)
*B01D 46/52* (2006.01)

(52) U.S. Cl.
CPC ........ *B01D 46/528* (2013.01); *B01D 2275/10* (2013.01); *B01D 2275/201* (2013.01)

(56) References Cited

U.S. PATENT DOCUMENTS

| | | | |
|---|---|---|---|
| 5,454,945 A | 10/1995 | Spearman | |
| 5,522,909 A * | 6/1996 | Haggard | B01D 46/522 55/327 |
| 5,782,791 A * | 7/1998 | Peterson | B01D 29/111 210/493.1 |
| 5,928,414 A * | 7/1999 | Wnenchak | D04H 3/02 55/528 |
| 6,315,130 B1 * | 11/2001 | Olsen | B01D 29/111 210/493.1 |
| 2001/0029952 A1 * | 10/2001 | Curran | B01D 46/0005 128/206.17 |
| 2003/0089233 A1 | 5/2003 | Borla | |
| 2006/0174597 A1 * | 8/2006 | Greene | A47L 9/122 55/482 |
| 2007/0119780 A1 * | 5/2007 | Zia | A61M 1/0236 604/410 |
| 2012/0037561 A1 * | 2/2012 | Schaeper | B01D 46/2411 210/493.5 |
| 2014/0144111 A1 | 5/2014 | Campbell et al. | |
| 2014/0260138 A1 * | 9/2014 | Edwards | B01D 46/523 55/483 |
| 2015/0059301 A1 * | 3/2015 | Kaufmann | B01D 46/0004 55/482 |
| 2019/0309194 A1 * | 10/2019 | Becker | C09J 123/0853 |
| 2019/0366252 A1 * | 12/2019 | Tate | B01D 46/522 |

\* cited by examiner 110
21 PLEATS
10
48 PLEATS 110  112
116
114

200
21 PLEATS
210
48 PLEATS 212
210
214

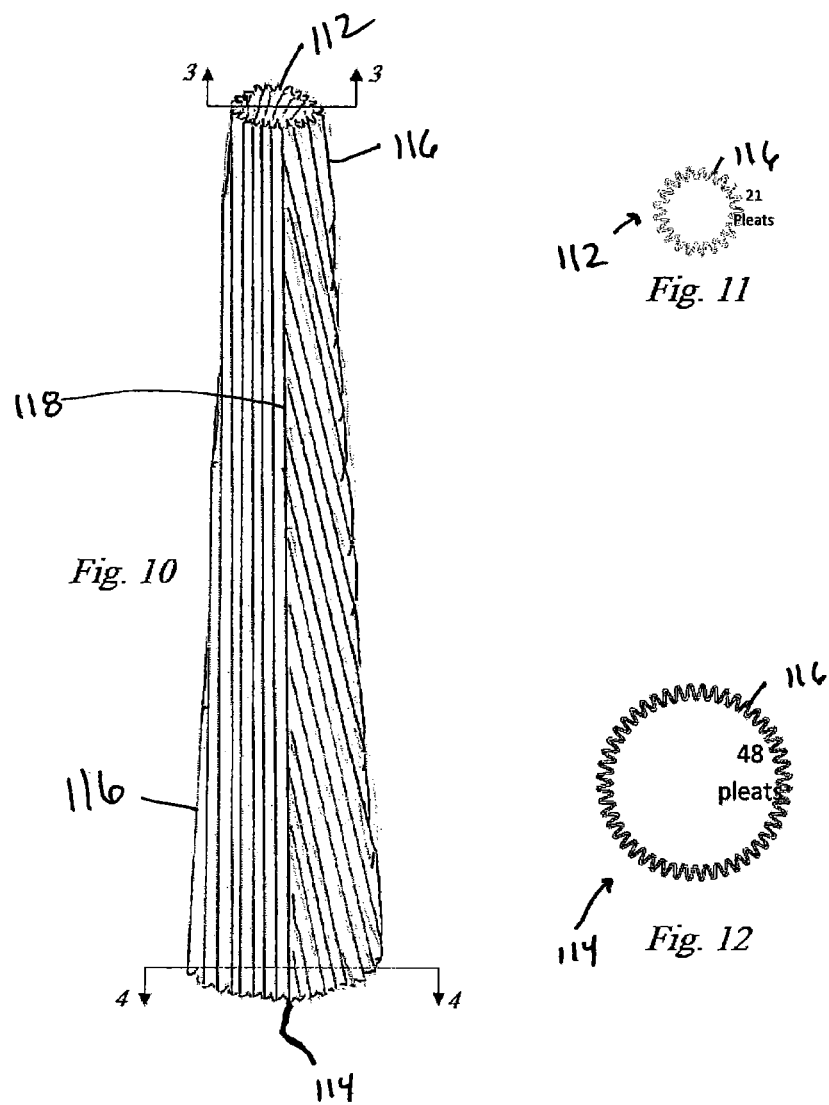

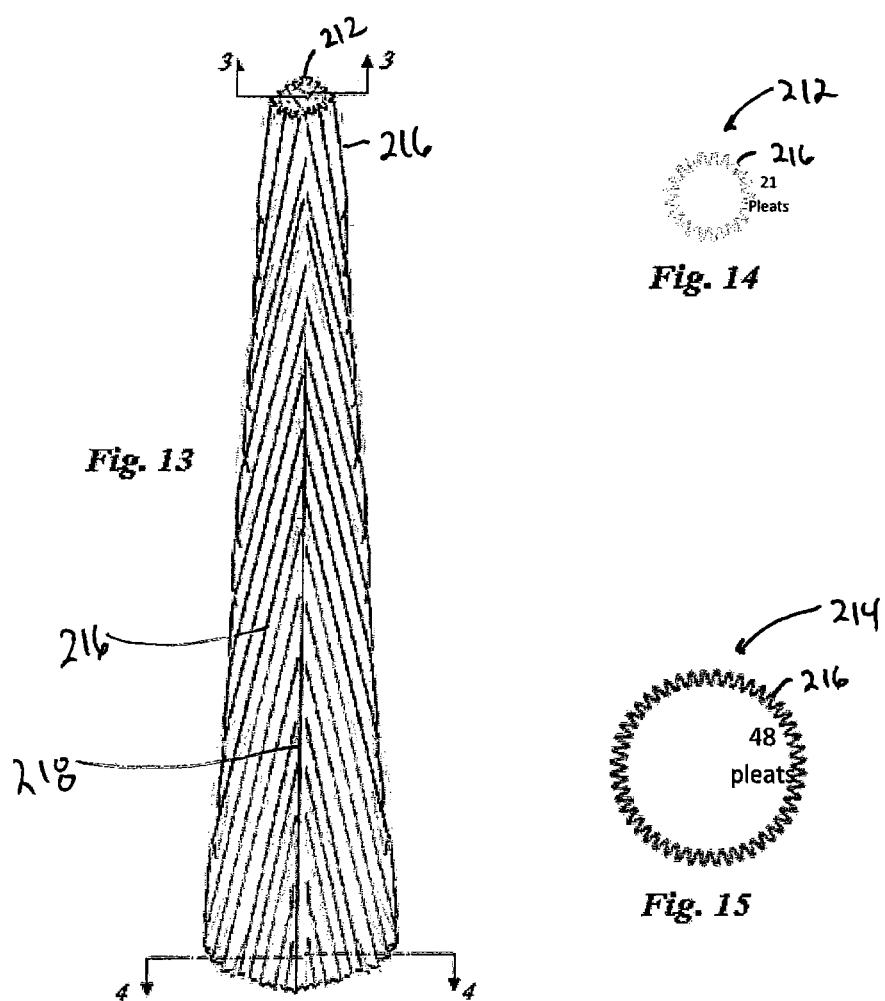

PLEATED MEDIA FOR A CONICAL SHAPED FILTER ELEMENT

CROSS SECTION TO RELATED APPLICATIONS

This patent application is a US national stage entry of PCT/US2019/063988 filed Dec. 2, 2019, which itself claims priority from U.S. Provisional Patent Application Ser. No. 62/774,116, filed Nov. 30, 2018, the disclosures of each of which is incorporated herein, in their entireties, by reference.

BACKGROUND

The present invention relates to a novel form of pleated filter media for a conical shaped filter element. More particularly the invention relates to a form of pleated filter media that has a varying number of pleats around the periphery of conical filter along the axial length of a conical shaped filter element. The inventions provide a means for optimum packing of pleated filter media (single or multiple layers) in a conical filter element configuration. The flow through the various sections of the filter element may be controlled by design by varying the pleat count along the axial length of the filter element and enhanced fluid flow distribution through the filter, reduced pressure drop, increased particle capture efficiency, and/or reduce particle entrainment. Also, the conical filter of the present invention will also facilitate better release characteristics of particulates in back flow cleaning applications.

Filter elements constructed by the means of this invention are useful for separation and/or capture of solid, liquid, and/or gelatinous particles from the fluid (gas or liquid) stream. The present invention is especially suited for coalescing applications where a conical filter configuration provides annular velocities substantially constant or decreasing in the direction of the primary fluid flow. The invention is especially suited for coalescing applications in compressed gas stream which will be the focus of the application but the same concepts hold for variety of applications including but not limited to liquid and/or gas separation for liquid streams or separation of solids or gelatinous particulates from a liquid or gas stream. Without limitation to the field of use in general filtration and separation application, the invention is also useful and of significant interest in applications where single or periodic cleaning of the filter is desired. For Example, a dust collection application is a prime example, as the invention will provide a means a means to pack optimum filtration media within a conical filter element while maintaining low annular flow rates.

High efficiency coalescing filter elements are well known within the industry and have been utilized to remove liquid aerosols from compressed gas streams for many years. Generally, a coalescing filter element is cylindrical in shape and can flow either inside-to-outside or outside-to-inside. U.S. Pat. No. 5,454,945 discloses the use of a conical shaped coalescing filter element providing an advantage over a cylindrical coalescing filter element for flowing inside-to-outside whereby the annular velocity of the gas phase is substantially constant or decreasing along its axial length reducing the re-entrainment of coalesced liquid droplets. A conical coalescer reduces annular velocity thereby reducing the chances of re-entrainment of the coalesced liquid droplets.

The conical filter of the prior art are typically optimized by expanding the base diameter of the filter and reducing the top diameter of the filter based on the filtration and separation applications. Pleated conical filters of the prior have an equal number of pleats around the circumference of the filter along the axial length of the filter. Therefore, the pleat spacing or number of pleats per unit circumference length is not a constant and varies in a predetermined manner and dictated by the number pleats incorporated into the filter. Therefore, pleats are more packed at the top than the bottom and may not result in optimum flow through the filter for the intended application.

Although a conical shaped coalescing filter element with pleated filter media of the prior art provides an advantage over a cylindrical shape for reducing the re-entrainment of coalesced liquid droplets, it suffers from under-utilized filter media and uneven flux through the filter media. This is mainly a result of the fixed number of pleats utilization of the prior art.

Pleated filter media used in conical shaped coalescing filter elements of prior art is formed from a cylindrical tube containing a plurality of pleats with a fixed number of pleats along its axial length. One end of the cylindrical tube is compressed to reduce the diameter and or the other end is expanded to increase the diameter to form a conical shape. The area of compressed pleated media has more pleats per circumferential length than the area with expanded pleated media.

When the number of pleats per circumferential length is increased or decreased beyond the optimal count then undesirable restrictions in the flow path of the compressed gas occur which increases the pressure drop through the filter media. As the pressure drop increases more energy must be expended to push the compressed gas through the filter media.

In addition, when the number of pleats per circumferential length is reduced then large gaps between each pleat are created. Ideally, it is desired to fill these gaps with pleated media to increase the total surface area of filter media.

Furthermore, differences in the number of pleats per circumferential length along the axial length creates differences in flux throughout the filter media pack that results in uneven particle capture and/or coalescence of liquid droplets. Uneven flow through various sections of the filter element results in suboptimum performance of the filter; it leads to multitude of inefficiencies such as, increased particle penetration, increased pressure drop across the filter and decreased dirt holding capacity at a given fluid flow rate through the filter and the fixed filtration surface area.

In filter design it is highly desired to provide optimum pleat spacing throughout the filter for a given application to increase filtration efficiency and dirt holding capacity and to lower pressure drop and energy consumption. It is desired to pack the most amount of filter area within a given volume without restricting the flow based on the filter application specifications such as the fluid flow rate, particulate concentration, desired change of pressure, particulate re-entrainment, etc.

In the prior art filter, pleat spacing (spacing between the pleats) decreases along the axial direction of the conical filter starting from the base of the filter (larger end of the cone). The pleat spacing at the base of the conical element is always more open than the other end of the filter element. Fluid flow is preferentially increased in sections with the optimum pleat spacing (lowest resistance to flow or highest pleat permeability) and is limited to a small section of the filter element.

If the filter is designed for optimal performance at base of the element, it may not even be possible to fit the pleat pack within the confined of the endcap at the opposite end of the filter. And in cases where the pleat pack fits within the pleat pack, the pleat spacing is restricted and suboptimal as opposed to the base of the filter where the spacing is optimal.

If the filter is designed for optimal performance at the opposite end of the base, the pleat pack would fit within the confines of the base but will also lead to suboptimal performance as the base of the filter would have benefited if more media was packed and the pleat spacing was reduced.

If the filter is designed for optimal performance somewhere between the base and the opposite end of the filter, the filter spacing and performance will only be optimal at the location of optimal pleat spacing. Thereby, the performance would be suboptimal below and above, the optimal pleat spacing.

SUMMARY OF THE INVENTION

In the present invention a pleated media design was devised where the pleated media is cut in a particular pattern so it forms conical shape when rolled into a conical tube.

The present invention provides a means to construct a conical element where the pleat spacing may be substantially maintained throughout the filter element or adjusted to the application as desired, thereby providing optimum packing of the filter for each application. The pleat count is not limited to the fixed count (along the longitudinal axis of the conical filter element) as in the prior art, it may be adjusted as needed by the application to optimize flow and performance parameters. The present invention provides improved flow and performance parameters for the same filtration area as compared to the filters of the prior art.

The present invention, provides a means to an improved conical filter and/or coalescer where the desires for low annular velocities and high filtration and/or coalescing efficiencies may be balanced.

In the present invention, a pleated filter media is provided with adjustable and/or uniform pleat spacing along the axial length of a conical shape. Such a configuration allows for substantially even flow throughout the entire coalescing filter element while fully utilizing the available volume for pleated filter media pack.

In a preferred embodiment of the present invention the pleat media is cut in a pattern of a flattened frustum of a cone. The pattern can be aligned to the pleated media so one edge of the pattern aligns with a pleat. The pattern can also be aligned so it is symmetric with respect to the pleats of the pleated media.

The pleated media is then rolled into a frustum of a cone and the mating edges joined with an adhesive or filler to create a seam. In some cases a channel can be used with an adhesive to form the seam. Various forms of channels for potting the seam are disclosed. The objective of the seam is to provide a substantially leak free path such that majority of the fluid flow passes through the filter media and not bypass it.

The seamed pleated media has substantially uniform pleat spacing along its axial length. As noted previously, the maintaining of this pleat spacing provides significant advantages over pleat patters of variable spacing, as are currently used.

For each application, there is an optimum pleat spacing which yields optimum filtration and separation performance. In the conical filters of the prior art, the optimum pleat spacing is only obtained (if at all), along one periphery at a single plane perpendicular to the major axis of the conical filter. The present invention provides a means of expanding the distribution of the preferred pleat spacing beyond a single plane and preferably substantially throughout the filter element.

BRIEF DESCRIPTION OF THE DRAWINGS

FIG. 10 is a view of a pleated filter media according to the present invention.

FIG. 11 is a cross-sectional view along line 3-3 of FIG. 10.

FIG. 12 is a cross-sectional view along line 4-4 of FIG. 10.

FIG. 13 is a view of another embodiment of a pleated filter media according to the present invention.

FIG. 14 is a cross-sectional view along line 3-3 of FIG. 13.

FIG. 15 is a cross-sectional view along line 4-4 of FIG. 13.

DETAILED DESCRIPTION OF THE INVENTION

Figures 1, 2:
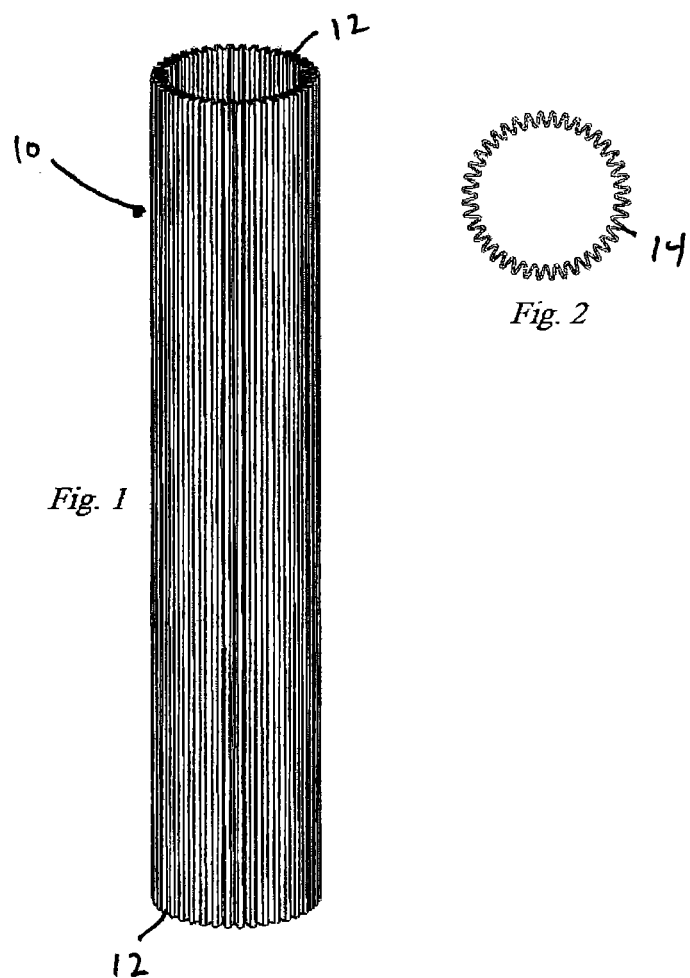
FIG. 1 is a view of a prior art pleated filter media formed in a cylindrical tube.
FIG. 2 is an end view of FIG. 1.

FIGS. 1 and 2 show a known filter media configuration, wherein the filter is in the form of a tube 10. The filter has 2 ends 12 and, as is more clearly seen in FIG. 2, has a series of pleats 14 running the length of the tube.

Figures 3, 4:
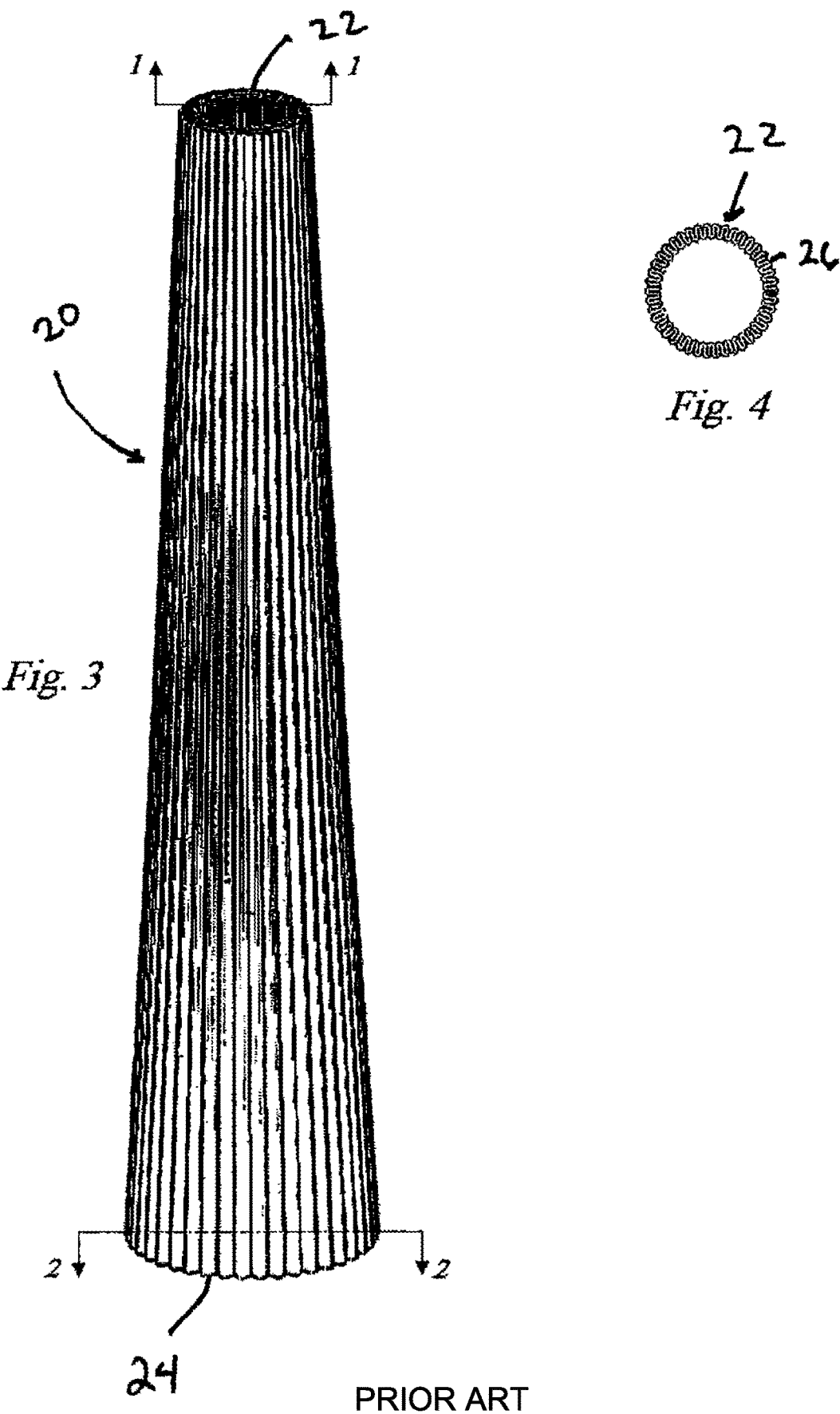
FIG. 3 is a view of a cylindrical tube of pleated filter media formed into conical shape.
FIG. 4 is a cross-sectional view along line 1-1 of FIG. 3.
Figure 5:
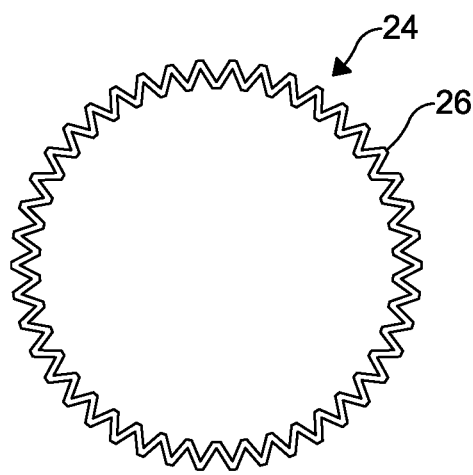
FIG. 5 is a cross sectional view along line 2-2 of FIG. 3.

FIGS. 3, 4 and 5 show an alternative known filter configuration. This filter is in the form of a cone 20, and has a first end, 22 and a second, larger end 24. As can be seen in FIGS. 4 and 5, this known configuration results in having pleats 26, which have a wider spacing from each other at the larger end 24 than at the smaller end 22. As discussed herein, this can result in undesirable affects when the filter is used.

Figure 6:
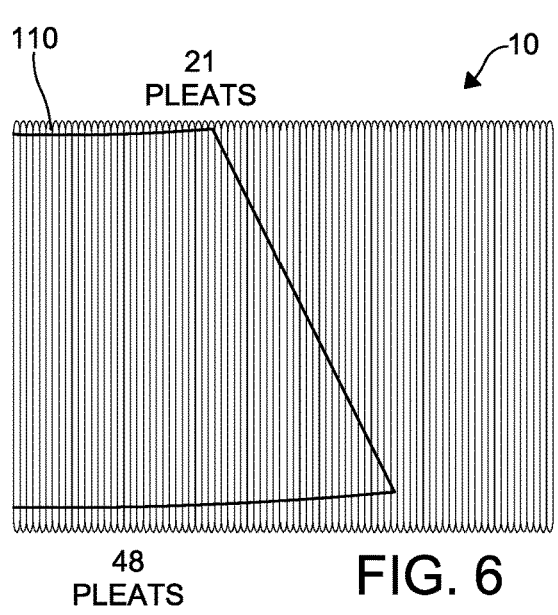
FIG. 6 is shows a view of a filter for use in the present invention.
Figure 7:
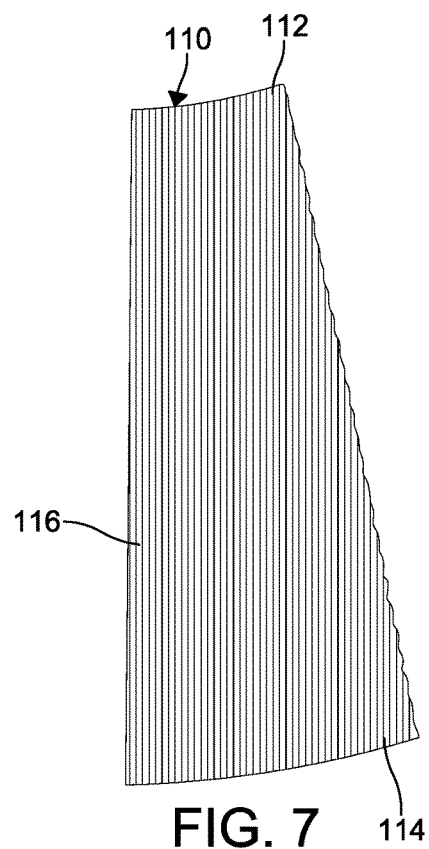
FIG. 7 is a view of a cut portion of FIG. 6 according to the present invention.

FIG. 6 shows a square filter 100, from which a filter according to the present invention can be derived. A cut frustum of a cone 110, is shown against the square filter of FIG. 6, and is then depicted in its cut shape in FIG. 7. It can be seen on FIG. 7 that there are differing numbers of pleats at ends 112 and 114. It can also be seen that in an embodiment of the invention, that on one side of the filter, the cut follows substantially parallel to the outside pleat 116, but on the other side of the media the cut cuts off the pleats at varying lengths along that side.

Figure 8:
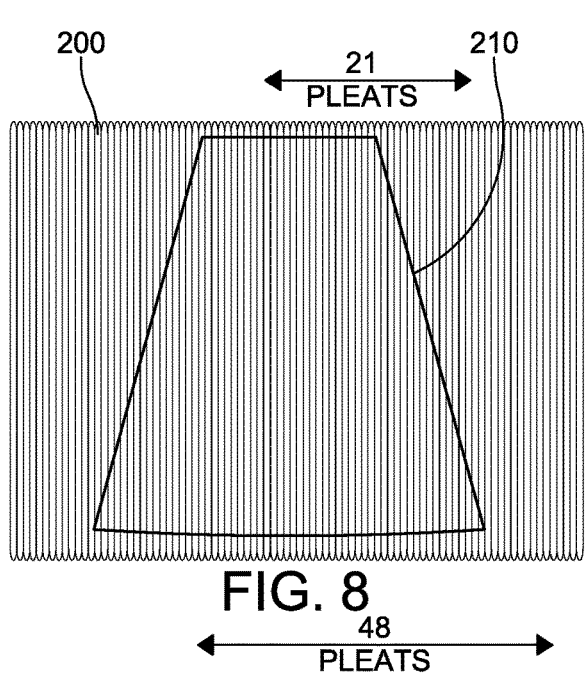
FIG. 8 is a view of another embodiment of a filter for use in the present invention.
Figure 9:
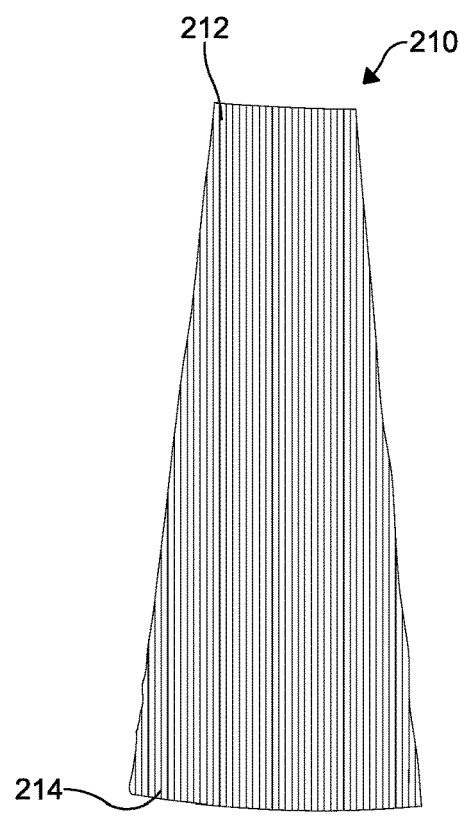
FIG. 9 is a view of the cut portion of FIG. 8 according to the present invention.

FIGS. 8 and 9 show an alternative embodiment of the present invention. FIG. 8 shows a square filter 200, from which a filter according to the present invention can be derived. A cut frustum of a cone 210, is shown against the square filter of FIG. 8, and is then depicted in its cut shape in FIG. 9. It can be seen on FIG. 9 that there are differing numbers of pleats at ends 212 and 214, with more pleats occurring at the larger end. It can also be seen that in this embodiment of the invention, that on both sides of the filter, the cut is configured so that it cuts off the pleats at varying lengths along that side.

FIG. 10 shows the filter of FIG. 6 when it is formed into a cone. In this embodiment, a portion of the pleats 116 terminate at the end 112, and others terminate along the side 118 of the unrolled media. In the particular embodiment shown, end 112, as shown in FIG. 11 has 21 pleats 116, and end 114 as shown in FIG. 12 has 48 pleats. The exact number of pleats at each end can be calculated to maximize effectiveness based on the formula described hereinbelow.

FIG. 13 shows the filter of FIG. 8 when it is formed into a cone. In this embodiment, a portion of the pleats 216 terminate at the end 212, and others terminate along the side 218 of the unrolled media. In the particular embodiment shown, end 212, as shown in FIG. 14 has 21 pleats 216, and end 214, as shown in FIG. 15, has 48 pleats 216. The exact number of pleats at each end can be calculated, again, to maximize effectiveness based on the formula described hereinbelow. In this embodiment, the peats 216 that terminate at edge 218 can, but are not required to, terminate against a corresponding pleat.

The present invention provides a means of packing more surface area in a given volume, based upon the principal that a conical filter with a base inner radius (Ri) and height (h) as a cylindrical filter has a lower pleat packing capacity. As can be seen from the table below, the surface area advantage of the present filter (denoted as Pinnacle) over a conventional conical filter of the same pleat height increases as the ratio of the inner radii decreases. The loss of pleated filter media surface area of a pinnacle filter over a conical filter as compared to a cylinder with the same base is only 50%.

TABLE 1

Table 1 - Surface Area comparison - All filters having the same base diameter, pleat count (at top of the element) and pleat height.

| ri/Ri | SAp/SAc | (SAp − SAc)/SAc | SAp/SAcyl | (SAp − SAcyl)/SAcyl | SAc/SAcyl | (SAc − SAcyl)/SAcyl | (SAc − SAcyl)/(SAp − SAcyl) |
|---|---|---|---|---|---|---|---|
| 0.1 | 5.5 | 450% | 0.6 | −45% | 0.1 | −90% | |
| 0.2 | 3.0 | 200% | 0.6 | −40% | 0.2 | −80% | |
| 0.3 | 2.2 | 117% | 0.7 | −35% | 0.3 | −70% | |
| 0.4 | 1.8 | 75% | 0.7 | −30% | 0.4 | −60% | |
| 0.5 | 1.5 | 50% | 0.8 | −25% | 0.5 | −50% | 50.0% |
| 0.6 | 1.3 | 33% | 0.8 | −20% | 0.6 | −40% | |
| 0.7 | 1.2 | 21% | 0.9 | −15% | 0.7 | −30% | |
| 0.8 | 1.1 | 13% | 0.9 | −10% | 0.8 | −20% | |
| 0.9 | 1.1 | 6% | 1.0 | −5% | 0.9 | −10% | |

The data in the table is based upon the following assumptions:

$PPI_c = PPI_p$, $hp = h_c$, $(R_0 - r_0) \ll h$, SA maximized, $PH_c = PH_p = r_i$, $R_{cyl} = (r + R)/2$ The following abbreviates are also used in the table:

H=Filter height (subscript p, c designate conical and Pinnacle™ filters)

$PH_c$=Pleat Height of conventional conical filter $PH_p$=Pleat Height of Present Invention (Pinnacle™ Filter)

$PPI_c$=Pleats per unit length at the small base of the conical filter.

$PPI_p$=Pleats per unit Length for the present invention (Pinnacle Filter with constant PPI throughout the element)

$r_i$=Inner radius of Frustum Cone (top)

$R_i$=Inner radius of Frustum Cone (bottom; base)

SA=Filtration Surface Area $SA_c$=Surface Area of Conventional Filter $SA_p$=Surface Area of Pinnacle Filter $SA_{cyl}$=Surface Area of conventional Cylindrical Filter $SA_p/SA_c = (1 + R_i/r_i)/2$ $(SA_p - SA_c)/SA_c = (R_i/r_i - 1)/2$ $SA_p/SA_{cyl} = (1 + r_i/R_i)/2$ As the pleat count along the axis of the filter may change along the axis of the present invention, the surface area of the present invention may be optimized with deeper pleats than the prior art. The Filtration Surface area ratio of the present invention over the prior art conical filter element with the same filter height with optimum pleat depth for each filter type ($PH_c = r_i/2$, $PH_p = (r_i + R_i)/2$, $PPI_p$=constant) leads to the following equation:

$$\frac{SA_p}{SA_c} = \frac{1}{4}\left(1 + \frac{R_0}{r_0}\right)^2 \sqrt{1 + \left(\frac{R_0 - r_0}{h}\right)^2} \frac{PPI_p}{PPI_c}$$

Therefore, the surface ratio advantage of the present invention may be calculated for various scenarios. In cases where the filters are slender $(R_0 - r_0)/h \ll 1$, the above equation reduces to:

$$\frac{SA_p}{SA_c} = \frac{1}{4}\left(1 + \frac{R_0}{r_0}\right)^2 \frac{PPI_p}{PPI_c}$$

The surface advantage of the present invention is highlighted in the summary table below with $PPI_p = PPI_c$:

TABLE 2

Surface Area Advantage of the Present Invention

| $r_o/R_o$ | $r_i/R_i$ (Prior art) | $r_i/R_i$ (Invention) | $SA_p/SA_c$ | $SA_c/SA_p$ | $(SA_p - SA_c)/SA_c$ |
|---|---|---|---|---|---|
| 0.33 | 0.2 | 0.00 | 4.00 | 0.250 | 300% |
| 0.46 | 0.3 | 0.15 | 2.51 | 0.399 | 151% |
| 0.57 | 0.4 | 0.29 | 1.89 | 0.529 | 89% |
| 0.62 | 0.45 | 0.36 | 1.71 | 0.584 | 71% |
| 0.67 | 0.5 | 0.43 | 1.56 | 0.640 | 56% |
| 0.75 | 0.6 | 0.56 | 1.36 | 0.735 | 36% |
| 0.82 | 0.7 | 0.68 | 1.23 | 0.816 | 23% |
| 0.89 | 0.8 | 0.79 | 1.13 | 0.886 | 13% |
| 0.95 | 0.9 | 0.90 | 1.06 | 0.947 | 6% |
| 0.97 | 0.95 | 0.95 | 1.03 | 0.974 | 3% |
| 1.00 | 1 | 1.00 | 1.00 | 1.000 | 0% |

The PPI for a filter of the present invention where the filtration surface area is the same as the prior art filter may be calculated from the formula below:

$$PPI_p = \frac{SA_c}{SA_p}PPI_c = 4\left(1 + \frac{R_0}{r_0}\right)^{-2} PPI_c$$

As the pleats of the present invention are uniformly spaced full utilization of the pleats along the axis of the filters is achieved. The filter may be designed with optimum pleat spacing for the application throughout the filter element. And in cases where the permeability of the filter pack is low and filter element is slender and long, the pleat spacing may be adjusted such that permeability through the pleat pack decreases along the axis of the filter to promote flow through the entire element.

The maximum filtration area packing of the conical filters of the prior are is dictated by the small diameter of the cone.

The maximum filtration packing is obtained where the pleat height is about ¼ of the outer diameter. Therefore, the maximum packing and pleat height is limited by the top endcap. The optimum pleat height may be different than this value once other considerations are made for other pressure loss such as fluid flow expansion/contraction through the element.

In the conical filter of the present invention as the number of pleats may be varied along the longitudinal axis of the filter, the maximum filtration packing is dictated by the combination of the top and bottom endcaps (diameters of the cone). In the present invention, the maximum filtration packing is achieved at about ¼ of the average of the two outer pleat pack diameters. And as such provides a mean for additional packing than the prior art.

Although the above comparison depicts clear advantages of filter media packing of the present invention, in most applications, the filter is confined in a vessel and thereby the annular space between the vessel wall and the filter also needs to be considered. In such cases, the appropriate comparison would be to compare a conical filter which its base would substantially expands the vessel will be appropriate, In cases that multiple elements are designed within a vessel, the filter base diameter would be substantially equal to the center-to-center distance between the elements with consideration to manufacturing tolerances and assuring no interference between the filter elements. The expansion at the base of the element where annular velocities would be negligible provides a means of packing more filtration media within the vessel.

As shown above, the present invention provides a means of increase packing of filtration media within a conical filter. In coalescing applications, increase filter media provides a means of increase flow through the filter while maintain performance parameters. Therefore, the flow may be increased through the filter by the increased surface area or more importantly useable surface area. In order to negate the possibility of re-entrainment of coalesced droplet downstream it is preferred to maintain the annular velocity low and potentially same as before if annular space was at the limit of re-entrainment.

Table 2 demonstrates filter media packing potential of the present invention for a similar size conical filters (based on outer dimensions, neglecting inner differences). Based on media packing potential of the present invention, there is a potential to increase fluid flow as long as re-entrainment of coalesced liquid droplets is not reached by excessive annular velocities. If the at a given $r_o/R_o$, the prior art conical filter is at the limit of re-entrainment, the present invention facilitates construction of a conical filter element which takes into consideration the increased filter packing and thereby the present invention filter will have a smaller $r_o/R_o$ ratio as provided in the table 3 based on the noted assumptions:

TABLE 3

Surface Area Advantage of the Present Invention (Sizing Guideline based on assumptions)
Conical Filter

| $r_o/R_o$ | | | $r_i/R_i$ | |
|---|---|---|---|---|
| Conventional | Present Invention | $SA_p/SA_c$ | Conventional | Present invention |
| 0.618 | 0.333 | 1.250 | 0.447 | 0.000 |
| 0.667 | 0.455 | 1.306 | 0.500 | 0.143 |

TABLE 3-continued

Surface Area Advantage of the Present Invention (Sizing Guideline based on assumptions)
Conical Filter

| $r_o/R_o$ | | | $r_i/R_i$ | |
|---|---|---|---|---|
| Conventional | Present Invention | $SA_p/SA_c$ | Conventional | Present invention |
| 0.710 | 0.553 | 1.330 | 0.550 | 0.269 |
| 0.732 | 0.600 | 1.333 | 0.577 | 0.333 |
| 0.750 | 0.636 | 1.331 | 0.600 | 0.385 |
| 0.788 | 0.708 | 1.315 | 0.650 | 0.491 |
| 0.824 | 0.770 | 1.285 | 0.700 | 0.587 |
| 0.857 | 0.823 | 1.246 | 0.750 | 0.674 |
| 0.889 | 0.869 | 1.201 | 0.800 | 0.753 |
| 0.919 | 0.908 | 1.152 | 0.850 | 0.825 |
| 0.947 | 0.943 | 1.102 | 0.900 | 0.889 |
| 0.974 | 0.973 | 1.051 | 0.950 | 0.947 |
| 1.0000 | 1.000 | 1.000 | 1.000 | 1.000 |

The following assumptions were made in deriving this table: $PPI_c=PPI_p$, $hp=h_c$, $(R_0-r_0)<<h$, SA maximize ($PH_c=r_i$, $PH_p=(r_i+R_i)/2$);

and the following abbreviations are used:

$R_o$=Outer filter Radius is equal to vessel radius or ½ center to center distance between elements in multi element vessel)

ABBREVIATIONS

H=Filter height (subscript p, c designate conical and Pinnacle™ filters)
$PH_c$=Pleat Height of conventional conical filter=$r_{ic}$
$PH_p$=Pleat Height of Present Invention (Pinnacle™ Filter)=$(r_{ip}+R_i)/2$
$PPI_c$=Pleats per unit length at the small base of the conical filter.
$PPI_p$=Pleats per unit Length for the present invention (Pinnacle Filter with constant PPI throughout the element)
$r_{ic}$=Inner radius of Frustum Cone (Conical Filter)
$r_{ic}$=Inner radius of Frustum Cone (Pinnacle™ Filter)
$R_i$=Inner radius of Frustum Cone (bottom; base; assumed to be the same for Conical and Pinnacle™ filters)
SA=Filtration Surface Area
$SA_c$=Surface Area of Conventional Filter
$SA_p$=Surface Area of Pinnacle Filter
Derived Formulas:

$$\frac{SA_p}{SA_c} = \left(\frac{1}{4}\right)\left(1+\frac{r_{ip}}{r_i}\right)^2\left(\frac{PPI_p}{PPI_c}\right)\left(\frac{R_i}{R_{ic}}\right)^2$$

$$\frac{\text{Annular Space of Pinncle}}{\text{Annular Space of conical}} =$$

$$\frac{SA_p}{SA_c} \rightarrow \left(\frac{1-\left(\frac{r_{ip}}{R_i}\right)^2}{1-\left(\frac{r_{ic}}{R_i}\right)^2}\right) = \frac{SA_p}{SA_c} \rightarrow \frac{R_{ip}}{R_i} = \frac{1-\frac{1}{4}\frac{PPI_p}{PPI_c}\left(\left(\frac{R_i}{r_{ic}}\right)^2-1\right)}{1+\frac{1}{4}\frac{PPI_p}{PPI_c}\left(\left(\frac{R_i}{r_{ic}}\right)^2-1\right)}$$

$$\frac{\partial(SA_p/SA_c)}{d(R_{ic}/R_i)} = 0 \rightarrow -32\left(\frac{r_{ic}}{R_i}\right)\left(\left(\frac{PPI_p}{PPI_c}\right)\left(\frac{r_{ic}}{R_i}\right)^2+1\right)-4\left(\frac{PPI_c}{PPI_p}\right)\left(\frac{r_{ic}}{R_i}\right)^2 = 0$$

If $PPI_p=PPI_c \rightarrow \left(\frac{SA_p}{SA_c}\right)_{max} = \frac{4}{3}$ where $\frac{r_{ic}}{R_i}=\sqrt{\frac{1}{3}}$ & $\frac{r_{ip}}{R_i}=\frac{1}{3}$ As may be seen in the above table, under the assumed conditions and in the case where the prior art is at optimum surface rare and annular velocity, the present invention provides a means of providing a conical filter with improved flow capacity. This is in addition to the fact that the present invention provides a means to maintain open pleat spacing throughout the element which is highly desired for optimum performance.

As may be seen in the table there is an optimum $r_o/R_o$ ratio at which the benefits of the present invention is maximized under the given assumptions. As the $r_o/R_o$ ratio decreases and the benefits of the present invention in terms of surface area increase there is less annular space to be provided to take into account the added area. For the given example, the maximum improvement of 33% is achieved at $r_o/R_o$ of 0.6 for the present invention under the presumed assumption.

With the means provided here and known in the art, the present invention provides a substantial improvement in fluid flow through a conical filter element and better utilization of the available filter media. The present invention also provides flexibility in design where fluid flow may be directed to preferred parts of the element by varying the pleat spacing along the longitudinal axis.

The variability of pleat count along the longitudinal axis is not limited to a conical filter in the present invention. The same principle may be applied to cylindrical filter, especially if there is a desire to promote flow within certain sections of the filter versus others. Varying pleat counts along a cylindrical filter may be generated according to the present invention.

The invention claimed is:

1. A frusto-conical filter comprising:
a filter media comprising at least one layer of a filtering material;
one or more layers of the at least one layer of the filtering material comprising a plurality of pleats, wherein each pleat has a center axis and an axial length, the center axis of each pleat essentially equidistant from the center axis of its adjacent pleat along its axial length; and
the frusto-conical filter having a first end and a second end, the second end being spaced apart from the first end by the height of the cone, and one of the first and second ends is larger than the other of the first and second ends,
wherein the filter has a seam and wherein one of the plurality of pleats adjacent to the seam runs substantially parallel to the seam, and at least one other of the plurality of the pleats has an end that intersects the seam.

2. A frusto-conical filter comprising:
a filter media comprising at least one layer of a filtering material;
one or more layers of the at least one layer of the filtering material comprising a plurality of pleats, wherein each pleat has a center axis and an axial length, the center axis of each pleat essentially equidistant from the center axis of its adjacent pleat along its axial length; and
the frusto-conical filter having a first end and a second end, the second end being spaced apart from the first end by the height of the cone, and one of the first and second ends is larger than the other of the first and second ends,
wherein the pleats are of varying axial lengths.

3. A frusto-conical filter comprising:
a filter media comprising at least one layer of a filtering material;
one or more layers of the at least one layer of the filtering material comprising a plurality of pleats, wherein each pleat has a center axis and an axial length, the center axis of each pleat essentially equidistant from the center axis of its adjacent pleat along its axial length; and
the frusto-conical filter having a first end and a second end, the second end being spaced apart from the first end by the height of the cone, and one of the first and second ends is larger than the other of the first and second ends,
wherein a portion of the pleats extend the slant height of the cone and, wherein a second portion of the pleats are shorter than the slant height of the cone.

4. A frusto-conical filter comprising:
a filter media comprising at least one layer of a filtering material;
one or more layers of the at least one layer of the filtering material comprising a plurality of pleats, wherein each pleat has a center axis and an axial length, the center axis of each pleat essentially equidistant from the center axis of its adjacent pleat along its axial length; and
the frusto-conical filter having a first end and a second end, the second end being spaced apart from the first end by the height of the cone, and one of the first and second ends is larger than the other of the first and second ends,
wherein the at least one layer of a filtering material comprises multiple layers of a filtering material and wherein a portion of the multiple layers of the filtering material comprise fewer pleats than the one or more layers of the at least one layer of a filtering material.

* * * * *